United States Patent
Kohli

(10) Patent No.: US 10,607,256 B2
(45) Date of Patent: Mar. 31, 2020

(54) SYSTEMS AND METHODS FOR ANALYZING CONTENT AFFINITIES FROM DIGITAL WALLET TRANSACTION DATA

(71) Applicant: MasterCard International Incorporated, Purchase, NY (US)

(72) Inventor: Manoneet Kohli, O'Fallon, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 144 days.

(21) Appl. No.: 15/631,918

(22) Filed: Jun. 23, 2017

(65) Prior Publication Data

US 2018/0374119 A1 Dec. 27, 2018

(51) Int. Cl.
*G06Q 30/02* (2012.01)
*G06Q 20/36* (2012.01)

(52) U.S. Cl.
CPC ....... *G06Q 30/0255* (2013.01); *G06Q 20/363* (2013.01); *G06Q 30/0251* (2013.01); *G06Q 30/0267* (2013.01); *G06Q 30/0269* (2013.01); *G06Q 30/0277* (2013.01)

(58) Field of Classification Search
None
See application file for complete search history.

(56) References Cited

U.S. PATENT DOCUMENTS

| | | | |
|---|---|---|---|
| 7,945,473 B2 | 5/2011 | Fano et al. | |
| 8,645,200 B2 | 2/2014 | Fano et al. | |
| 8,650,075 B2 | 2/2014 | Fano et al. | |
| 8,650,079 B2 | 2/2014 | Fano et al. | |
| 2008/0134043 A1* | 6/2008 | Georgis | H04N 7/10 715/733 |

(Continued)

FOREIGN PATENT DOCUMENTS

| | | |
|---|---|---|
| EP | 2669859 A1 | 12/2013 |
| WO | 2016114653 A1 | 7/2016 |

OTHER PUBLICATIONS

"Paying With Your Data—The Real Promise of Mobile Wallets" (Eric Savitz, published on Jan. 11, 2013 athttps://www.forbes.com/sites/ciocentral/2013/01/11/paying-with-your-data-the-real-promise-of-mobile-wallets/#7c8209e81674) (Year: 2013).*

(Continued)

*Primary Examiner* — James M Detweiler
(74) *Attorney, Agent, or Firm* — Armstrong Teasdale LLP

(57) ABSTRACT

A computer-based method for providing promotional content to a user based on attributes of digital content purchased by the user is provided. The method includes receiving enrollment data for a user in response to the user enrolling in a digital wallet application. The method further includes, storing the enrollment data, and receiving digital wallet transaction data as part of a digital wallet transaction for digital content, the digital wallet transaction initiated by the user using the digital wallet application. The method further includes determining at least one content attribute associated with the digital content, storing the at least one content attribute, determining, based at least in part on the at least one content attribute, a content affinity for the user, selecting promotional content that matches the content affinity, and causing the selected promotional content to be presented to the user.

12 Claims, 7 Drawing Sheets

(56) References Cited

U.S. PATENT DOCUMENTS

| | | | |
|---|---|---|---|
| 2011/0035288 A1* | 2/2011 | Clyne | G06Q 30/02 |
| | | | 705/14.71 |
| 2013/0054470 A1 | 2/2013 | Campos et al. | |
| 2013/0159080 A1 | 6/2013 | Wu et al. | |
| 2014/0040946 A1* | 2/2014 | Gates, III | H04N 21/812 |
| | | | 725/34 |
| 2014/0214664 A1* | 7/2014 | Kim | G06Q 20/363 |
| | | | 705/41 |
| 2014/0289061 A1 | 9/2014 | Zenou | |
| 2015/0019313 A1 | 1/2015 | Alba et al. | |
| 2015/0278834 A1 | 10/2015 | Fano et al. | |
| 2015/0332374 A1 | 11/2015 | Fano et al. | |
| 2017/0103415 A1 | 4/2017 | Ghosh et al. | |
| 2017/0116599 A1 | 4/2017 | Gupta et al. | |

OTHER PUBLICATIONS

PCT International Search Report and Written Opinion, Application No. PCT/US2018/032011, dated Sep. 10, 2018, 14 pps.

* cited by examiner

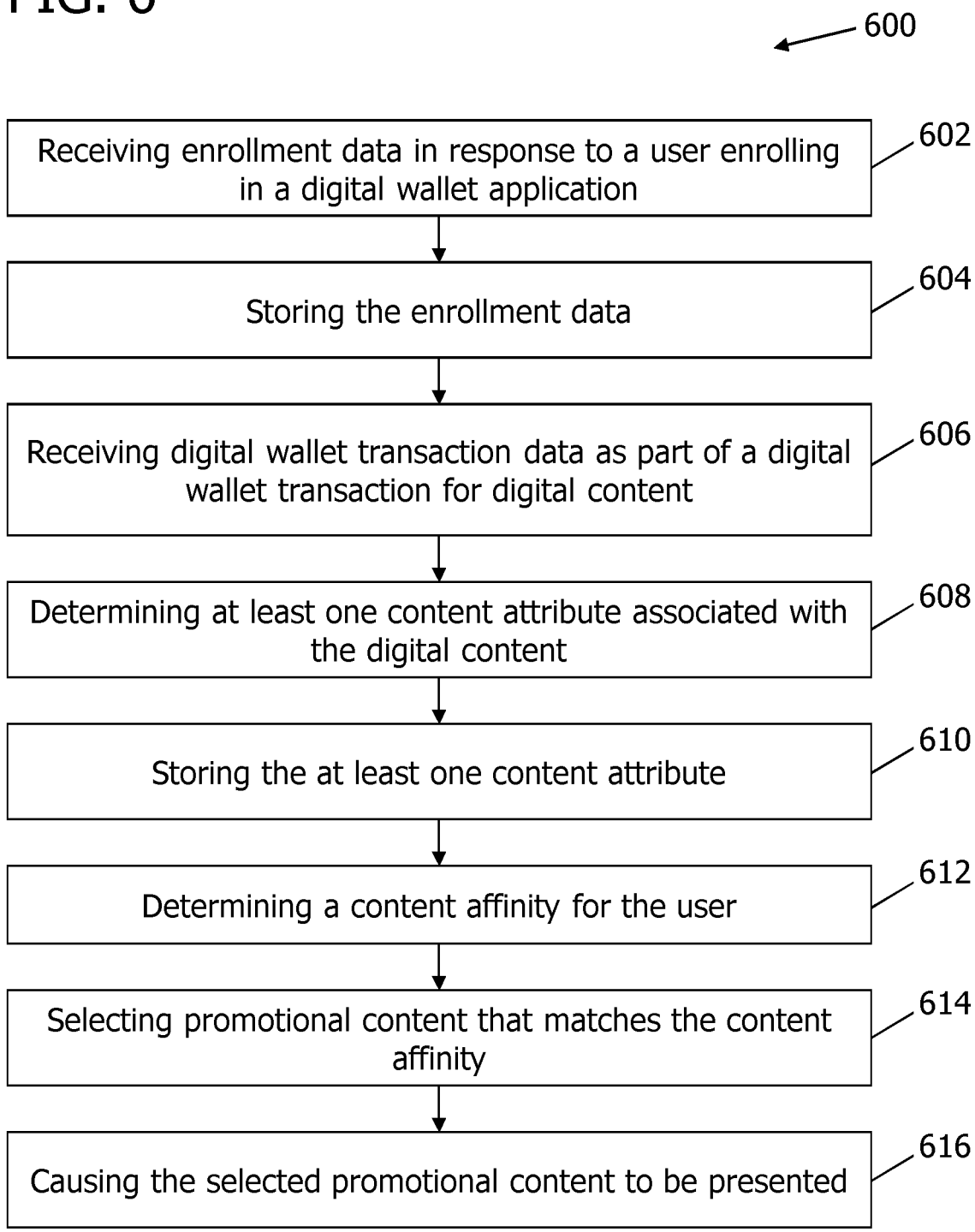

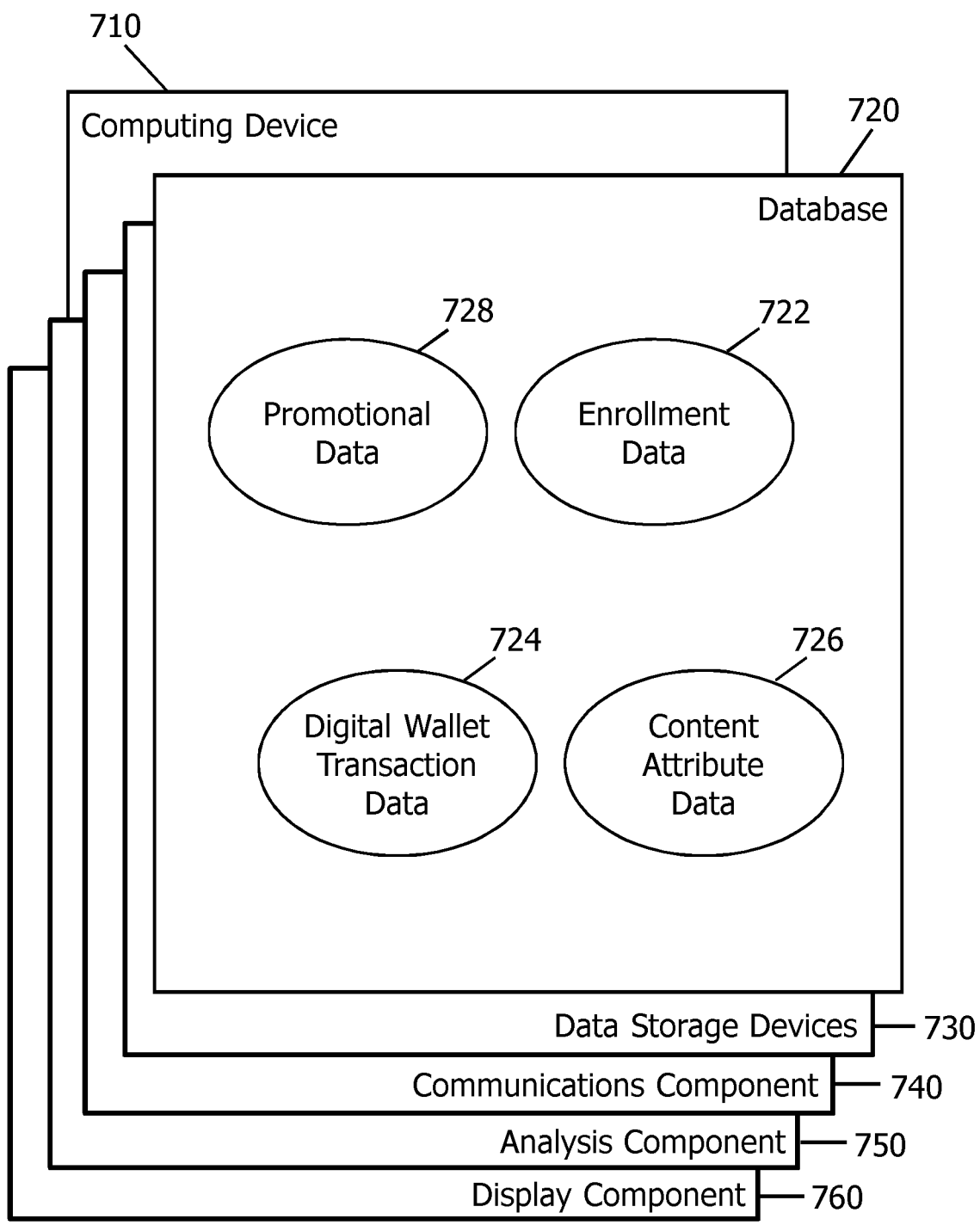

SYSTEMS AND METHODS FOR ANALYZING CONTENT AFFINITIES FROM DIGITAL WALLET TRANSACTION DATA

BACKGROUND

This disclosure relates generally to collecting and analyzing digital wallet transaction generated from purchases of digital content (e.g., software, movies, electronic books, television shows, etc.) using a digital wallet, and more particularly, to systems and methods for determining content affinities and presenting promotional content matching those content affinities by processing digital wallet transaction data.

Consumers are often times able to use a variety of methods to perform payment transactions to purchase goods and services. These methods include use of cash, plastic payment cards, smartphones, and other computing devices operated by users (also known as user computing devices) that are able to provide account data and transaction data to complete a purchase. In the case of account data being communicated for the transactions, a payment processor computing device processes the payment transactions over a processing network. The payment cards and/or user computing devices may be used at point of sale (POS) devices operated by merchants (in what are referred to herein as merchant location transactions), or users may initiate transactions when not at a merchant physical location (e.g., an online transaction initiated from home, such as to order goods from a merchant website). These latter transactions are sometimes also referred to as card-not-present transactions (CNP), because a payment card is not physically presented at a merchant location. In some cases, merchant location transactions and CNP transactions may be performed using a digital wallet that is either stored on a user's smartphone as an application, or on another user computing device as an account-on-file.

A digital wallet is typically an application the user accesses from a computing device. The computing device may be a device associated with the user, for example, a smartphone, a tablet, a wearable computing device, or some other computing device. The computer device may also be a laptop, a desktop, or other electronic device. The digital wallet application allows the user to use the computing device to purchase items without using a physical card. For example, the user may want to purchase a coffee. Rather than retrieving a physical card from a physical wallet, users may activate their digital wallet application on the user computing device and use card data saved in association with the digital wallet to purchase the coffee. In another example, users may want to purchase something from a website, such as concert tickets. Instead of entering the account number on the website to complete the transaction, users may access their digital wallet application on the computing device and use card data saved in association with the digital wallet to purchase the tickets. Typically, the digital wallet requires a biometric authentication from the user to complete the purchase. Biometric authentication is a process that uses biometric data that validates the identity of a user by measuring an intrinsic characteristic of the user. Biometric data may include passwords, fingerprint recognition, facial recognition, voice recognition, and/or any other biometric data use for identity verification. In one instance, the biometric authentication process may take place at the user computing device. In another instance, the biometric authentication process may take place at another computing device.

When a digital wallet transaction is performed for purchasing digital content (e.g., software, movies, electronic books, television shows, etc.), digital wallet transaction data is generated. A system is needed that is capable of capturing the digital wallet transaction data, determining content attributes associated with the digital content, and determining a content affinity for the user conducting the digital wallet transaction. By doing so, promotional data matching the content affinity of the user can be electronically presented to the user.

BRIEF DESCRIPTION

In one aspect, a computer-based method for providing promotional content to a user based on attributes of digital content purchased by the user is provided. The method is performed using a content analysis computing device including at least one processor in communication with at least one memory device. The method includes receiving enrollment data for a user in response to the user enrolling in a digital wallet application, the enrollment data including a device identifier identifying a user device associated with the user. The method further includes storing the enrollment data within the at least one memory device, and receiving digital wallet transaction data as part of a digital wallet transaction for digital content, the digital wallet transaction initiated by the user using the digital wallet application on the user device. The method further includes determining at least one content attribute associated with the digital content, and storing the at least one content attribute within the at least one memory device, the at least one content attribute stored in association with the enrollment data. The method further includes determining, based at least in part on the at least one content attribute, a content affinity for the user, selecting promotional content that matches the content affinity, and causing the selected promotional content to be presented to the user on the user device.

In another aspect, a content analysis computing device including at least one processor in communication with at least one memory device is provided. The content analysis computing device is configured to receive enrollment data for a user in response to the user enrolling in a digital wallet application, the enrollment data including a device identifier identifying a user device associated with the user. The content analysis computing device is further configured to store the enrollment data within the at least one memory device, and receive digital wallet transaction data as part of a digital wallet transaction for digital content, the digital wallet transaction initiated by the user using the digital wallet application on the user device. The content analysis computing device is further configured to determine at least one content attribute associated with the digital content, and store the at least one content attribute within the at least one memory device, the at least one content attribute stored in association with the enrollment data. The content analysis computing device is further configured to determine, based at least in part on the at least one content attribute, a content affinity for the user, select promotional content that matches the content affinity, and cause the selected promotional content to be presented to the user on the user device.

In a further aspect, a non-transitory computer readable medium that includes executable instructions for selecting promotional content based on digital wallet transaction data is provided. When executed by a content analysis computing device including at least one processor in communication with at least one memory device, the computer executable instructions cause the content analysis computing device to receive enrollment data for a user in response to the user enrolling in a digital wallet application, the enrollment data including a device identifier identifying a user device associated with the user. The computer executable instructions further cause the content analysis computing device to store the enrollment data within the at least one memory device, and receive digital wallet transaction data as part of a digital wallet transaction for digital content, the digital wallet transaction initiated by the user using the digital wallet application on the user device. The computer executable instructions further cause the content analysis computing device to determine at least one content attribute associated with the digital content, and store the at least one content attribute within the at least one memory device, the at least one content attribute stored in association with the enrollment data. The computer executable instructions further cause the content analysis computing device to determine, based at least in part on the at least one content attribute, a content affinity for the user, select promotional content that matches the content affinity, and cause the selected promotional content to be presented to the user on the user device.

BRIEF DESCRIPTION OF THE DRAWINGS

FIGS. 1-7 show example embodiments of the methods and systems described herein.

FIG. 1 is a schematic diagram illustrating an example content analysis platform for providing promotional content to a user based on attributes of digital content purchased by the user.

FIG. 2 is a block diagram of the content analysis platform shown in FIG. 1 including multiple example computing devices communicatively coupled to each other via a plurality of network connections.

FIG. 3 illustrates an example configuration of a server system that includes or is in communication with the content analysis computing device shown in FIG. 2.

FIG. 4 illustrates an example configuration of a user system, such as user computer device configured to transmit data to the content analysis computing device.

FIG. 5 shows an example configuration of a server system, such as the content analysis computing device shown in FIG. 2.

FIG. 6 shows an example method flow illustrating how the content analysis computing device receives digital wallet transaction data, determines a content affinity for a user based on the digital wallet transaction data received, and causes promotional content that matches the content affinity to be displayed to the user.

FIG. 7 shows an example configuration of a database within a content analysis computing device that collects enrollment, digital wallet transaction, content attribute, and promotional data.

Like numbers in the figures indicate the same or functionally similar components.

DETAILED DESCRIPTION

Figure 1:
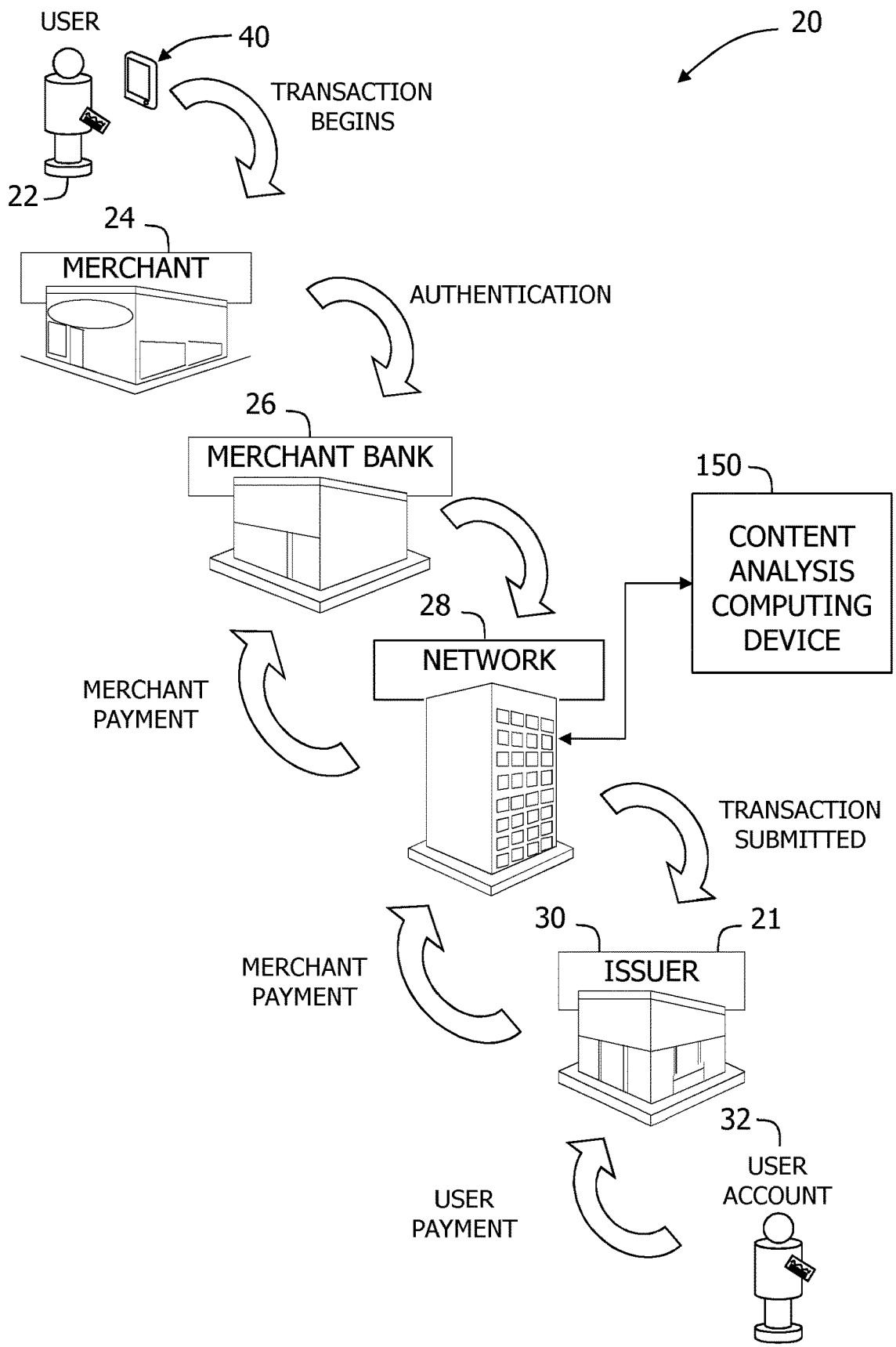

The present disclosure relates to a content analysis computing device that receives digital wallet transaction data, determines a content affinity for a user based on the digital wallet transaction data received, and causes promotional content that matches the content affinity to be displayed to the user, as described herein. Initially, the content analysis computing device receives enrollment data for a user in response to the user enrolling in a digital wallet application. The enrollment data includes, for example, a device identifier identifying a user device associated with the user. The enrollment data may also include account data (e.g., data identifying a payment card account associated with the user). The user device may be, for example, a smartphone, a tablet, or a wearable computing device. The user device may also be a laptop, a desktop, or another electronic device.

During the enrollment process, the user may also be requested to indicate whether they would like to participate in a promotional content program facilitated by the content analysis computing device. Further, as part of the enrollment process, the user may be asked to confirm that they allow the geographic location of the user device to be tracked, and that they allow the content analysis computing device to track their purchase patterns. In the example embodiment, the received enrollment data is stored within at least one memory device (e.g., a payment processor database).

After the enrollment process is complete, the user is able to use the digital wallet application on the user device to conduct financial transactions. For example, the user may conduct a digital wallet transaction to purchase digital content. As used herein, "digital content" includes software, movies, television shows, electronic books, articles, music, and any other digital multimedia content purchasable by the user and accessible or downloadable from a host computing device to the user device. Further, purchasing may include purchasing digital content for a limited period of time or a limited number of uses (i.e., a rental) and purchasing digital content for an unlimited/indefinite period of time. Purchasing digital content may also include purchasing or renewing a subscription to a video or music streaming service.

The digital content is generally purchased from a digital content provider. Further, the digital content may be purchased online or offline. In the example embodiment, when a digital wallet transaction for digital content is completed, corresponding digital wallet transaction data is received by the content analysis computing device (e.g., from a merchant computing device). The digital wallet transaction data may include, for example, a transaction amount, a merchant identifier (i.e., the digital content provider), the account data, etc. The digital wallet transaction data may also be stored within the at least one memory device.

In some embodiments, the enrollment data and/or digital wallet transaction data are anonymized and aggregated (e.g., by a merchant computing device) prior to receipt by the content analysis computing device (i.e., no personally identifiable information (PII) is received by the content analysis computing device). In other embodiments, the content analysis computing device may be configured to receive enrollment data and/or digital wallet transaction data that is not yet anonymized and/or aggregated, and thus may be configured to anonymize and aggregate the enrollment data and/or digital wallet transaction data. In such embodiments, any PII received by the content analysis computing device is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

In the example embodiment, the content analysis computing device determines at least one content attribute associated with the digital content. As used herein, a "content attribute" refers to any characteristic associated with the subject matter of the digital content. For example, a content attribute may include an actress or actor appearing in the digital content, a director, producer, or other crew member that created the digital content, a genre, theme, or location associated with the digital content, an author or artist of the digital content, etc. The content attribute may be, for example, associated with the digital content by the digital content provider as part of a classification system maintained by the digital content provider. Further, in some embodiments, the content analysis computing device may build a library of content attributes (e.g., based on the digital content monitored by the content analysis computing device).

In some embodiments, the content analysis computing device determines the at least one content attribute by communicating with a digital content provider computing device (i.e., a computing device operated by the digital content provider). For example, the content analysis computing device may transmit a content attribute request message to the digital content provider computing device, the content attribute request message including at least a portion of the digital wallet transaction data. The digital content provider computing device uses the digital wallet transaction data to determine the at least one content attribute associated with the digital content, and transmits a content attribute response message to the content analysis computing device, the content attribute response message including the at least one content attribute.

In other embodiments, the at least one content attribute is included in the digital wallet transaction data, and the content analysis computing device determines the at least one content attribute directly from the digital wallet transaction data. Alternatively, the content analysis computing device may determine the at least one content attribute using any suitable methods. For example, in some embodiments, digital content is provided to the user and/or sponsored by a party (e.g., an interchange network or payment processor) that operates the content analysis computing device. In such embodiments, because the party entity operates the content analysis computing device and provides/sponsors the purchased digital content, the at least one content attribute is readily retrievable/determinable by the content analysis computing device.

In the example embodiment, once the at least one content attribute is determined, the at least one content attribute is stored within the at least one memory device in association with the enrollment data. Accordingly, the at least one content attribute is associated with the user of the digital wallet application.

Based at least in part on the at least one content attribute, the content analysis computing device determines a content affinity for the user. As used herein, a "content affinity" refers to a user's preference for a particular content attribute. In the example embodiment, the content analysis computing device determines the content affinity by identifying patterns from content attributes for a plurality of pieces of digital content. For example, if a first user purchases numerous movies and television shows that include the same actor, the content analysis computing device may determine the first user has a content affinity for that actor. In another example, if a second user purchases multiple science fiction movies and books, the content analysis computing device may determine the second user has a content affinity for science fiction. In yet another example, if a third user purchases television shows and novels that take place in Italy, the content analysis computing device may determine the second user has a content affinity for Italy. Further, content attributes associated with digital content from a first digital content provider (e.g., an electronic book provider) may be used to determine a content affinity that may be leveraged to recommend or promote digital content from a second content provider (e.g., a video streaming service provider).

In the example embodiment, the content analysis computing device selects, for presenting to the user, promotional content that matches the content affinity. Promotional content may include, for example, advertisements, product offers, interesting facts, etc. Because the promotional content matches the determined content affinity, the promotional content is targeted towards the user's preferences, increasing the likelihood that the user will respond positively to the promotional content. For example, for a first user having a content affinity for a particular actor, the content analysis computing device may select promotional content including a product endorsement by that particular actor. In another example, for a second user having a content affinity for science fiction subject matter, the content analysis computing device may select promotional content having a science fiction theme. In yet another example, for a third user having a content affinity for Italy, the content analysis computing device may select promotional content including an advertisement for an Italian vacation package.

In the example embodiment, to select promotional content, the content analysis computing device is communicatively coupled to a promotional content database storing promotional content. The content analysis computing device, using the content affinity, searches for and retrieves promotional content that matches the content affinity (e.g., by querying a database using the content affinity). Alternatively, the promotional content may be selected using any suitable methods.

In some embodiments, the promotional content is also selected based on a current geographic location of the user device. For example, when selecting promotional content, the content analysis computing device may receive a geolocation signal from the user device (e.g., in accordance with the user's confirmation during the enrollment process the geographic location of the user device may be tracked) that indicates the current geographic location of user device. The content analysis computing device then selects promotional content that matches both the content affinity for the user and the current geographic location of user device. For example, if a user has a content affinity for a particular movie, and a scene in that movie was filmed near the current geographic location of the user device, the content analysis computing device may select promotional content that includes an interesting fact explaining the nearby filming location to the user.

Once the promotional content is selected, the content analysis computing device causes the promotional content to be presented to the user on the user device. For example, in some embodiments, the promotional content may be presented on the user device by transmitting a push notification or alert to the user device that includes the promotional content. In other embodiments, the promotional content may be presented by embedding the promotional content into multimedia content (e.g., a web page, video, image, or song) accessed by the user on the user device. Further, in some embodiments, the promotional content may be embedded in the purchased digital content used to ultimately select the promotional content. The content analysis computing device may interface with an advertising platform or digital content provider, for example, to embed the promotional content in the digital content or other multimedia content.

In at least some known systems, digital content data (e.g., content attribute data) is not received with or determinable from transaction data. Thus, it is not possible to associate digital content data with transaction data in at least some known systems. Accordingly, in at least some known systems, digital content data cannot be analyzed to determine a content affinity for a user and associated with transaction data for that user. Thus, in at least some known systems, transaction data cannot be leveraged to provide promotional content to a user that is tailored to the user's interests.

Further, transaction data may be tied to a particular issuer and/or merchant. Accordingly, any possible analysis of that transaction data may be limited to analyzing content or services purchased by a user from a single merchant/digital content provider, failing to take into account digital content purchased by the user from other merchants/digital content providers. In contrast, digital wallet applications are generally not associated with a particular merchant or issuer. Accordingly, by processing digital wallet data using the content analysis computing device described herein, digital content from multiple merchants/digital content providers may be analyzed, providing a comprehensive view of a particular user's content purchases, and subsequently determining more accurate content affinities for that user.

The technical problems addressed by content analysis computing platform include at least one of: (i) inability of accurately and rapidly determining content attributes and content affinities for digital content, and (ii) inability of generating digitally presenting promotional content that that align with a user's content affinities.

The methods and systems described herein may be implemented using computer programming or engineering techniques including computer software, firmware, hardware, or any combination or subset thereof, wherein the technical effects may be achieved by (i) receiving enrollment data for a user in response to the user enrolling in a digital wallet application, (ii) storing the enrollment data, (iii) receiving digital wallet transaction data as part of a digital wallet transaction for digital content, the digital wallet transaction initiated by the user using the digital wallet application, (iv) determining at least one content attribute associated with the digital content, (v) storing the at least one content attribute, (vi) determining, based at least in part on the at least one content attribute, a content affinity for the user, (vii) selecting promotional content that matches the content affinity, and (viii) causing the selected promotional content to be presented to the user.

The resulting technical benefits achieved by the content analysis computing platform include at least one of: (i) improving efficiency and accuracy of electronically delivering promotional content to users by linking digital wallet transaction data for digital content and content attributes for the digital content, (ii) improving efficiency of getting users to engage with electronically delivered promotional content by matching presented promotional content to content affinities associated with the users, thus increasing sales, (iii) and increasing user satisfaction because electronically delivered promotional content is more of interest to them.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are examples only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram illustrating an example content analysis platform for providing promotional content to a user based on attributes of digital content purchased by the user. Embodiments described herein may relate to a transaction card system, such as a payment card payment system using the Mastercard interchange network. The Mastercard interchange network is a set of proprietary communications standards promulgated by Mastercard International Incorporated for the exchange of financial transaction data and the settlement of funds between financial institutions that are members of Mastercard International Incorporated. (Mastercard is a registered trademark of Mastercard International Incorporated located in Purchase, N.Y.). Embodiments described herein also relate to a content analysis computing device 150 that is communicatively coupled to an interchange network 28. Content analysis computing device 150 is configured to receive digital wallet transaction data from interchange network 28 and determine a content affinity for a user based on the digital wallet transaction data received, as described herein.

In the example content analysis platform, a financial institution called the "issuer" or "issuing bank" issues an account, such as a credit card account, to the user 22, who uses the account to tender payment for a purchase from a merchant 24. In one embodiment, the user presents a digital wallet to merchant 24 (also known as a card-present transaction) using a user computing device. In another embodiment, the user does not present a digital wallet and instead performs a card-not-present transaction. For example, the card-not-present transaction may be initiated via a digital wallet application, through a website or web portal, via telephone, or any other method that does not require the user to present a physical payment card to merchant 24 (e.g., via scanning the digital wallet).

To accept payment with the transaction card, merchant 24 establishes an account with a financial institution that is part of the financial payment system. This financial institution is usually called the "merchant bank," the "acquiring bank," or the "acquirer." In one embodiment, user 22 tenders payment for a purchase using a transaction card at a transaction processing device 40 (e.g., a point of sale device), then merchant 24 requests authorization from a merchant bank 26 for the amount of the purchase. The request is usually performed through the use of a point-of-sale terminal, which reads user 22's account information from a magnetic stripe, a chip, barcode, or embossed characters on the transaction card (e.g., a digital wallet) and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether user 22's account 32 is in good standing and whether the purchase is covered by user 22's available credit line. Based on these determinations, the request for authorization will be declined or accepted. If the request is accepted, an authorization code is issued to merchant 24.

When a request for authorization is accepted, the available credit line of user 22's account 32 is decreased. Normally, a charge for a payment card transaction is not posted immediately to user 22's account 32 because certain rules do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If user 22 cancels a transaction before it is captured, a "void" is generated. If user 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional digital wallet transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, user account information, a type of transaction, information regarding the purchased item and/or service, and/or other suitable information, is associated with a transaction and transmitted between parties to the transaction as digital wallet transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant 24's account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

As described above, the various parties to the payment card transaction include one or more of the parties shown in FIG. 1 such as, for example, user 22, merchant 24, merchant bank 26, interchange network 28 (also referred to herein as payment processor 28), issuer bank 30, and/or an issuer processor 21.

Figure 2:
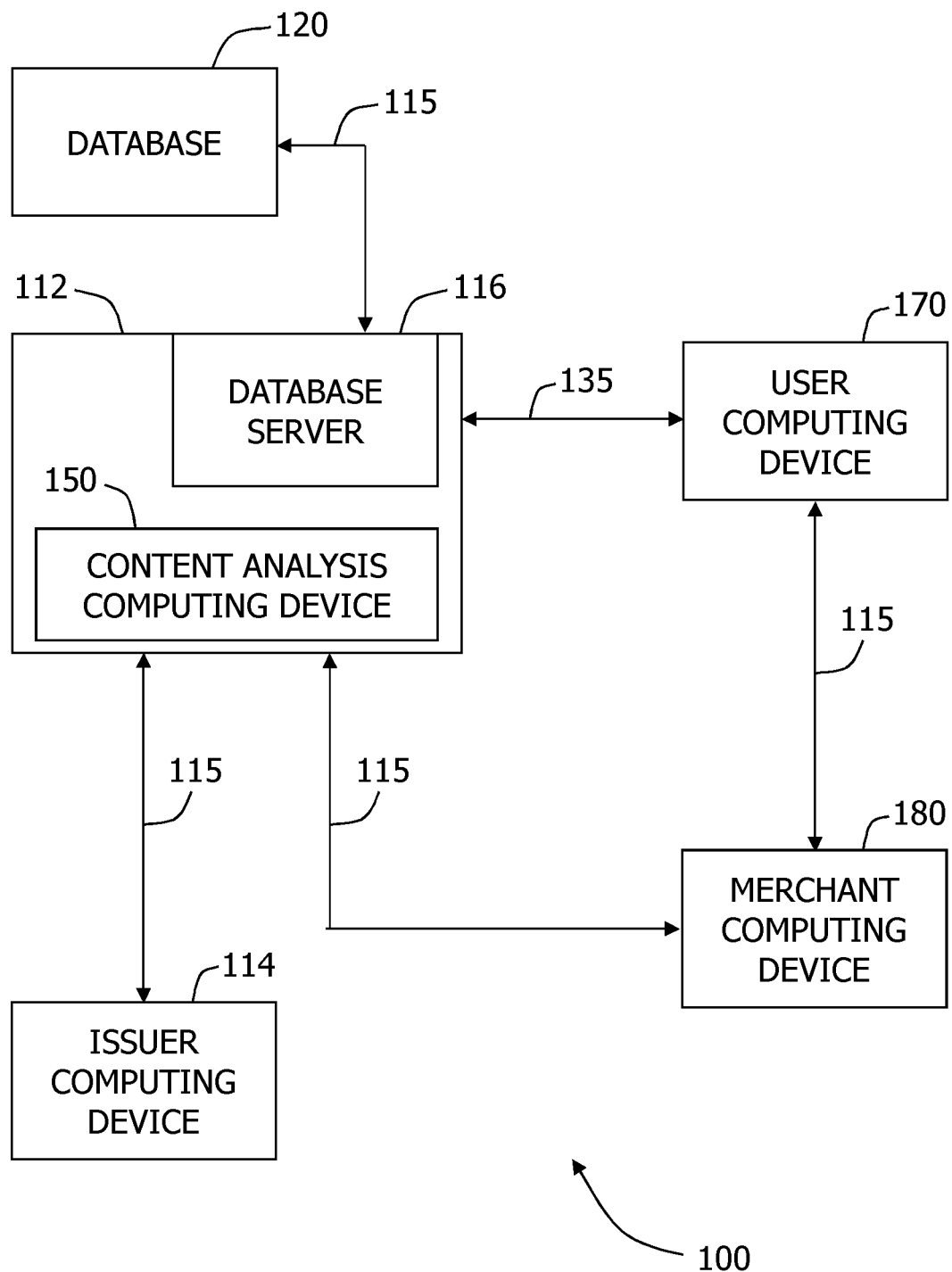

FIG. 2 is a block diagram of an example content analysis computing platform 100, in which a variety of computing devices are communicatively coupled to each other via a plurality of network connections. These network connections may be Internet, LAN/WAN (Local Area Network/Wide Area Network), or other connections capable of transmitting data across computing devices. Content analysis computing platform 100 includes content analysis computing device 150 and a database server 116. In one embodiment, content analysis computing device 150 and database server 116 are components of server system 112. Server system 112 may be a server, a network of multiple computer devices, a virtual computing device, or the like. Content analysis computing device 150 is connected to at least one user computing device 170, a merchant computing device 180, and an issuer computing device 114 via at least a network connection 115.

In one embodiment, content analysis computing device 150 is configured to receive digital wallet transaction data from merchant computing device 180, over a network connection 115. Content analysis computing device 150 may be operated by and/or affiliated with interchange network 28. Alternatively, content analysis computing device 150 may be operated by and/or affiliated with any entity that enables content analysis computing device to function as described herein.

As noted with respect to FIG. 1, when a user performs a transaction at a merchant location, digital wallet transaction data is generated. Digital wallet transaction data may be transmitted across computer devices as a digital wallet transaction data message. In one embodiment, when a user performs a transaction at merchant computing device 180 associated with a merchant, digital wallet transaction data for the transaction is transmitted to server system 112. Server system 112 processes the digital wallet transaction data in the manner described with respect to FIG. 1 and also provides it to content analysis computing device 150. Content analysis computing device 150 is also configured to communicate with user computing device 170 via an electronic communication channel or method that is distinct from one used to communicate digital wallet transaction data. In the example embodiment, content analysis computing device 150 is configured to communicate with user computing device 170 via electronic communication channel 135.

The digital wallet transaction data message may also include a transaction amount, a transaction date, account data related to the payment card used to perform the transaction (e.g., primary account number associated with payment card, card expiration date, card issuer, card security code, or the like), a merchant identifier, stock-keeping unit (SKU) data relating to the goods or services purchased from the user, or the like.

Database server 116 is connected to database 120, which contains information on a variety of matters, as described below in greater detail. In one embodiment, database 120 is stored on server system 112 and can be accessed by potential users of server system 112. In an alternative embodiment, database 120 is stored remotely from server system 112 and may be non-centralized. Database 120 may include a single database having separated sections or partitions or may include multiple databases, each being separate from each other. Database 120 may store demographic data for each user in communication with content analysis computing device 150.

In the example embodiment, content analysis computing device 150 includes specifically designed computer hardware to perform the steps described herein, and includes specifically designed computer implementation instructions. Content analysis computing device 150 is a specially designed and customized computer device built to perform the specific functions of receiving digital wallet transaction data, determining a content affinity for a user based on the digital wallet transaction data received, and causing promotional content that matches the content affinity to be displayed to the user, as described herein.

Figure 3:
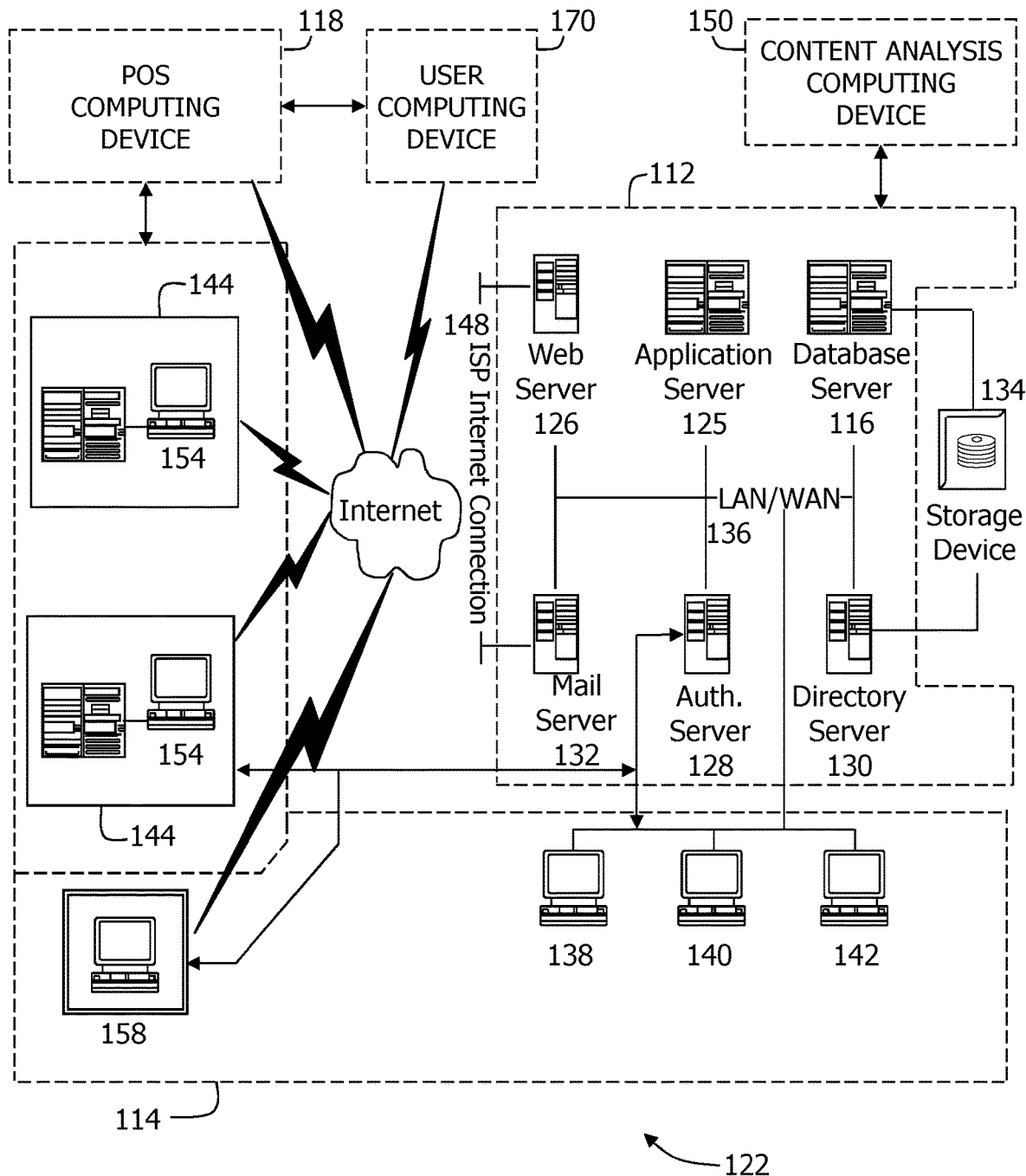

FIG. 3 is an expanded block diagram of an example embodiment of server architecture of a content analysis computer platform 100 including other computer devices in accordance with one embodiment of the present disclosure. Components in content analysis computer platform 100 are identified in FIG. 3 using the same reference numerals as used in FIG. 2. Content analysis computer platform 100 includes server system 112. Server system 112 further includes database server 116, an application server 125, a web server 126, an authentication server 128, a directory server 130, and a mail server 132. A storage device 134 is coupled to database server 116 and directory server 130. Servers 116, 125, 126, 128, 130, and 132 are coupled in a network connection, such as LAN/WAN 136. In addition, an issuer bank workstation 138 (similar to issuer computing device 114 shown in FIG. 2), acquirer bank workstation 140, and a third party processor workstation 142 may be coupled to LAN/WAN 136.

In the example embodiment, issuer bank workstation 138, acquirer bank workstation 140, and third party processor workstation 142 are coupled to LAN/WAN 136 using network connection 115 (shown in FIG. 2). Workstations 138, 140, and 142 are coupled to LAN/WAN 136 using an Internet link or are connected through an Intranet. In the example embodiment, content analysis computing device 150 is in communication with issuer bank workstation 138 and POS computing device 118 (which may be, for example, the same as merchant computing device 180 (as shown in FIG. 2)). User computer device 170 is connected to the Internet and may be a smartphone, personal computer, tablet computer, desktop, laptop, or similar computing device. Content analysis computing device 150 is configured to receive digital wallet transaction data, from POS computing device 118 and user computing device 170 via server system 112.

Each workstation 138, 140, and 142 is a computer with Internet access. Although the functions performed at the workstations typically are illustrated as being performed at respective workstations 138, 140, and 142, such functions can be performed at one of many personal computers coupled to LAN/WAN 136. Workstations 138, 140, and 142 are illustrated as being associated with separate functions only to facilitate an understanding of the different types of functions that can be performed by individuals having access to LAN/WAN 136.

Server system 112 is configured to be communicatively coupled to various individuals, including employees and third parties 144 (e.g., auditors, developers, merchants, acquirers, issuers, etc.), using an ISP Internet connection 148. The communication in the example embodiment is illustrated as being performed using the Internet. However, any other wide area network (WAN) type communication can be utilized in other embodiments. In other words, the systems and processes are not limited to being practiced using the Internet.

In the example embodiment, any authorized individual having a workstation 154 can access content analysis computer platform 100. At least one of the client systems includes a manager workstation 156 located at a remote location. Workstations 154 and 156 are personal computers having a web browser. Also, workstations 154 and 156 are configured to communicate with server system 112. Furthermore, authentication server 128 communicates with remotely located client systems, including a client system 156 using a telephone link. Authentication server 128 is configured to communicate with other client workstations 138, 140, and 142 as well.

Figure 4:
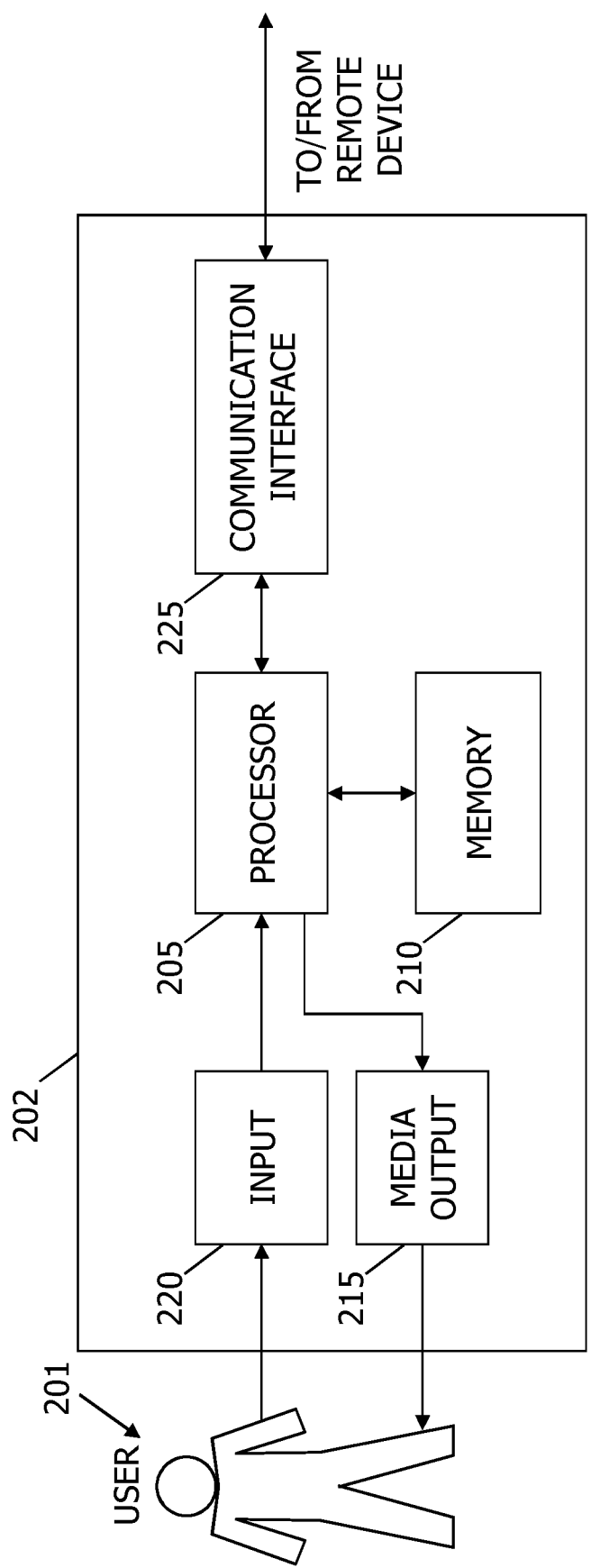

FIG. 4 illustrates an example configuration of a user system, such as a user computing device configured to transmit data to content analysis computing device 150. User system 202 may include, but is not limited to, user computing device 170 (shown in FIG. 2). In the example embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. For example, media output component 215 may be a display component configured to display component lifecycle data in the form of reports, dashboards, communications, or the like. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively connectable to a remote device such as server system 112 (shown in FIG. 2). Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WI-MAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a web site from server system 112. A client application allows user 201 to interact with a server application from server system 112.

Figure 5:
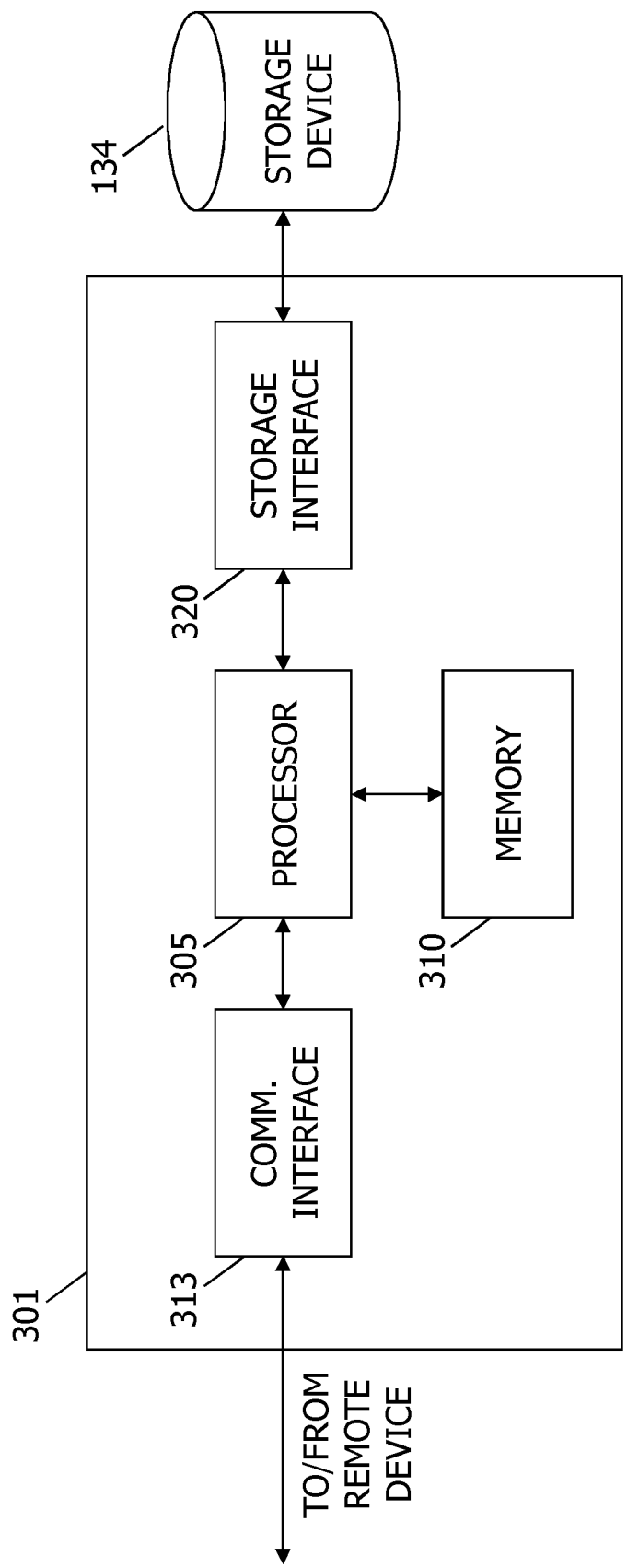

FIG. 5 illustrates an example configuration of a server system 301 such as the server system 112 shown in FIG. 2 that includes content analysis computing device 150 (shown in FIG. 2). Server system 301 may include, but is not limited to, database server 116 (shown in FIG. 2) or content analysis computing device 150 (shown in FIG. 2). In some embodiments, server system 301 is similar to server system 112 (shown in FIG. 2).

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in storage 134 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 305 is operatively coupled to a communication interface 313 such that server system 301 is capable of communicating with a remote device such as a user system or another server system 301. For example, communication interface 313 may receive communications from issuer computing devices 114 via the Internet, as illustrated in FIG. 2.

Processor 305 may also be operatively coupled to a storage device 134. Storage device 134 is any computer-operated hardware suitable for storing and/or retrieving data. In some embodiments, storage device 134 is integrated in server system 301. In other embodiments, storage device 134 is external to server system 301 and is similar to database 120 (shown in FIG. 2). For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are examples only, and are thus not limiting as to the types of memory usable for storage of a computer program.

FIG. 6 is an example flow diagram illustrating a method flow 600 by which content analysis computing device 150 (shown in FIG. 2) receives digital wallet transaction data, determines a content affinity for a user based on the digital wallet transaction data received, and causes promotional content that matches the content affinity to be displayed to the user, as described herein. In the example embodiment, content analysis computing device 150 receives 602 enrollment data for a user in response to the user enrolling in a digital wallet application. The enrollment data includes, for example, a device identifier identifying a user device associated with the user. The enrollment data may also include account data (e.g., data identifying a payment card account associated with the user). The user device may be, for example, a smartphone, a tablet, or a wearable computing device. The user device may also be a laptop, a desktop, or another electronic device.

During the enrollment process, the user may also be requested to indicate whether they would like to participate in a promotional content program facilitated by content analysis computing device 150. Further, as part of the enrollment process, the user may be asked to confirm that they allow the geographic location of the user device to be tracked, and that they allow content analysis computing device 150 to track their purchase patterns. In the example embodiment, the received enrollment data is stored 604 within at least one memory device (e.g., a payment processor database).

After the enrollment process is complete, the user is able to use the digital wallet application on the user device to conduct financial transactions. For example, the user may conduct a digital wallet transaction to purchase digital content. As used herein, "digital content" includes software, movies, television shows, electronic books, articles, music, and any other digital multimedia content purchasable by the user and accessible or downloadable from a host computing device to the user device. Further, purchasing may include purchasing digital content for a limited period of time or a limited number of uses (i.e., a rental) and purchasing digital content for an unlimited/indefinite period of time. Purchasing digital content may also include purchasing or renewing a subscription to a video or music streaming service.

The digital content is generally purchased from a digital content provider. Further, the digital content may be purchased online or offline. In the example embodiment, when a digital wallet transaction for digital content is completed, corresponding digital wallet transaction data is received 606 by content analysis computing device 150 (e.g., from a merchant computing device). The digital wallet transaction data may include, for example, a transaction amount, a merchant identifier (i.e., the digital content provider), the account data, etc. The digital wallet transaction data may also be stored within the at least one memory device.

In some embodiments, the enrollment data and/or digital wallet transaction data are anonymized and aggregated (e.g., by a merchant computing device) prior to receipt by content analysis computing device 150 (i.e., no personally identifiable information (PII) is received by the content analysis computing device). In other embodiments, content analysis computing device 150 may be configured to receive enrollment data and/or digital wallet transaction data that is not yet anonymized and/or aggregated, and thus may be configured to anonymize and aggregate the enrollment data and/or digital wallet transaction data. In such embodiments, any PII received by content analysis computing device 150 is received and processed in an encrypted format, or is received with the consent of the individual with which the PII is associated. In situations in which the systems discussed herein collect personal information about individuals including cardholders or merchants, or may make use of such personal information, the individuals may be provided with an opportunity to control whether such information is collected or to control whether and/or how such information is used. In addition, certain data may be processed in one or more ways before it is stored or used, so that personally identifiable information is removed.

In the example embodiment, content analysis computing device 150 determines 608 at least one content attribute associated with the digital content. As used herein, a "content attribute" refers to any characteristic associated with the subject matter of the digital content. For example, a content attribute may include an actress or actor appearing in the digital content, a director, producer, or other crew member that created the digital content, a genre, theme, or location associated with the digital content, an author or artist of the digital content, etc. The content attribute may be, for example, associated with the digital content by the digital content provider as part of a classification system maintained by the digital content provider. Further, in some embodiments, content analysis computing device 150 may build a library of content attributes (e.g., based on the digital content monitored by content analysis computing device 150).

In some embodiments, content analysis computing device 150 determines 608 the at least one content attribute by communicating with a digital content provider computing device (i.e., a computing device operated by the digital content provider). For example, content analysis computing device 150 may transmit a content attribute request message to the digital content provider computing device, the content attribute request message including at least a portion of the digital wallet transaction data. The digital content provider computing device uses the digital wallet transaction data to determine the at least one content attribute associated with the digital content, and transmits a content attribute response message to content analysis computing device 150, the content attribute response message including the at least one content attribute.

In other embodiments, the at least one content attribute is included in the digital wallet transaction data, and content analysis computing device 150 determines 608 the at least one content attribute directly from the digital wallet transaction data. Alternatively, content analysis computing device 150 may determine 608 the at least one content attribute using any suitable methods. For example, in some embodiments, digital content is provided to the user and/or sponsored by a party (e.g., an interchange network or payment processor) that operates content analysis computing device 150. In such embodiments, because the party entity operates content analysis computing device 150 and provides/sponsors the purchased digital content, the at least one content attribute is readily retrievable/determinable by content analysis computing device 150.

In the example embodiment, once the at least one content attribute is determined 608, the at least one content attribute is stored 610 within the at least one memory device in association with the enrollment data. Accordingly, the at least one content attribute is associated with the user of the digital wallet application.

Based at least in part on the at least one content attribute, content analysis computing device 150 determines 612 a content affinity for the user. As used herein, a "content affinity" refers to a user's preference for a particular content attribute. In the example embodiment, content analysis computing device 150 determines 612 the content affinity by identifying patterns from content attributes for a plurality of pieces of digital content. For example, if a first user purchases numerous movies and television shows that include the same actor, content analysis computing device 150 may determine the first user has a content affinity for that actor. In another example, if a second user purchases multiple science fiction movies and books, content analysis computing device 150 may determine the second user has a content affinity for science fiction. In yet another example, if a third user purchases television shows and novels that take place in Italy, content analysis computing device 150 may determine the second user has a content affinity for Italy. Further, content attributes associated with digital content from a first digital content provider (e.g., an electronic book provider) may be used to determine a content affinity that may be leveraged to recommend or promote digital content from a second content provider (e.g., a video streaming service provider).

In the example embodiment, content analysis computing device 150 selects 614, for presenting to the user, promotional content that matches the content affinity. Promotional content may include, for example, advertisements, product offers, interesting facts, etc. Because the promotional content matches the determined content affinity, the promotional content is targeted towards the user's preferences, increasing the likelihood that the user will respond positively to the promotional content. For example, for a first user having a content affinity for a particular actor, content analysis computing device 150 may select promotional content including a product endorsement by that particular actor. In another example, for a second user having a content affinity for science fiction subject matter, content analysis computing device 150 may select promotional content having a science fiction theme. In yet another example, for a third user having a content affinity for Italy, content analysis computing device 150 may select promotional content including an advertisement for an Italian vacation package.

In the example embodiment, to select promotional content, content analysis computing device 150 is communicatively coupled to a promotional content database storing promotional content. Content analysis computing device 150, using the content affinity, searches for and retrieves promotional content that matches the content affinity (e.g., by querying a database using the content affinity). Alternatively, the promotional content may be selected using any suitable methods.

In some embodiments, the promotional content is also selected 614 based on a current geographic location of the user device. For example, when selecting promotional content, content analysis computing device 150 may receive a geolocation signal from the user device (e.g., in accordance with the user's confirmation during the enrollment process the geographic location of the user device may be tracked) that indicates the current geographic location of user device. Content analysis computing device 150 then selects 614 promotional content that matches both the content affinity for the user and the current geographic location of user device. For example, if a user has a content affinity for a particular movie, and a scene in that movie was filmed near the current geographic location of the user device, content analysis computing device 150 may select promotional content that includes an interesting fact explaining the nearby filming location to the user.

Once the promotional content is selected 614, content analysis computing device 150 causes 616 the promotional content to be presented to the user on the user device. For example, in some embodiments, the promotional content may be presented on the user device by transmitting a push notification or alert to the user device that includes the promotional content. In other embodiments, the promotional content may be presented by embedding the promotional content into multimedia content (e.g., a web page, video, image, or song) accessed by the user on the user device. Further, in some embodiments, the promotional content may be embedded in the purchased digital content used to ultimately select the promotional content. Content analysis computing device 150 may interface with an advertising platform or digital content provider, for example, to embed the promotional content in the digital content or other multimedia content.

FIG. 7 shows an example configuration of a database 720 within a computing device 710, along with other related computing components, that may be used to receive digital wallet transaction data, determine a content affinity for a user based on the digital wallet transaction data received, and cause promotional content that matches the content affinity to be displayed to the user, as described herein. In some embodiments, computing device 710 is similar to server system 112 (shown in FIG. 2). In some embodiments, database 720 is similar to database 120 (shown in FIG. 2). In the example embodiment, database 720 includes enrollment data 722, digital wallet transaction data 724, content attribute data 726, and promotional data 728. Enrollment data 722 includes, for example, a device identifier identifying a user device associated with the user and account data account associated with the user. Digital wallet transaction data 724 may include, for example, a transaction amount, a merchant identifier, account data, etc. Content attribute data 726 includes one or more content attributes, as described herein, and promotional data 728 includes promotional content.

Computing device 710 also includes data storage devices 730. Computing device 710 also includes communications component 740 that may perform, for example, the receiving 602 enrollment data and/or the receiving 606 digital wallet transaction data steps described in FIG. 6. Further, computing device 710 also includes an analysis component 750 that may perform the determining 608 at least one content attribute, the determining 612 a content affinity, and/or the selecting 614 promotional content steps described in FIG. 6.

In addition, computing device 710 also includes a display component 760 that may perform the causing 616 the selected promotional content to be displayed step described in FIG. 6.

As will be appreciated based on the foregoing specification, the above-described embodiments of the disclosure may be implemented using computer programming or engineering techniques including computer software, firmware, hardware or any combination or subset thereof, wherein the technical effect is to collect digital wallet data from a digital wallet transaction initiated by a user for determining the user's demographics. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for providing promotional content to a user based on attributes of digital content purchased by the user, said method performed using a content analysis computing device comprising at least one processor in communication with at least one memory device, said method comprising:

receiving enrollment data for a user in response to the user enrolling in a digital wallet application, the enrollment data including a device identifier identifying a user device associated with the user;

storing the enrollment data within the at least one memory device;

receiving, from a payment processing network, digital wallet transaction data as part of a digital wallet transaction for digital content from a digital content provider, the digital wallet transaction initiated by the user over the payment processing network using the digital wallet application on the user device, the digital content accessible or downloadable from a digital content provider computing device using the user device, the digital content provider computing device operated by the digital content provider;

determining, from the digital wallet transaction data received from the payment processing network, at least one content attribute associated with the digital content that is accessible or downloadable from the digital content provider computing device, wherein the at least one content attribute is a characteristic associated with the subject matter of the digital content, and wherein determining the at least one content attribute comprises:

transmitting a content attribute request message from the content analysis computing device to the di tat content provider computing device, the content attribute request message including at least a portion of the digital wallet transaction data for the digital content; and receiving at the content analysis computing device, in response to the content attribute request message, a content attribute response message from the digital content provider computing device, the content attribute response message including the at least one content attribute associated the digital content, the at least one content attribute determined by the digital content provider using the at least a portion of the digital wallet transaction data and a classification astern maintained by the digital content provider;

storing the at least one content attribute received from the digital content provider computing device within the at least one memory device, the at least one content attribute stored in association with the enrollment data to link the at least one content attribute to the user;

determining, based at least in part on the at least one content attribute, a content affinity for the user;

selecting promotional content that matches the content affinity; and causing the selected promotional content to be presented to the user on the user device by at least one of i) transmitting a push notification to the user device that includes the promotional content and ii) embedding the promotional content into multimedia content accessed by the user on the user device.

2. The method of claim 1, further comprising receiving a geolocation signal from the user device that indicates a current geographic location of the user device, wherein selecting promotional content comprises selecting promotional content that matches the content affinity for the user and that matches the current geographic location of the user device.

3. The method of claim 1, wherein determining a content affinity for the user comprises determining the content affinity based on the at least one content attribute and at least one additional content attribute associated with additional digital content purchased by the user.

4. The method of claim 1, wherein embedding the promotional content into multimedia content comprises embedding the promotional content into the same digital content used in determining the content affinity.

5. The method of claim 1, wherein the at least one content attribute includes at least one of an actress or actor appearing in the digital content, a director, producer, or other crew member that created the digital content, a genre, theme, or location associated with the digital content, and an author or artist of the digital content.

6. The method of claim 1, wherein determining a content affinity for the user comprises determining an actress or actor that the user prefers, and wherein selecting promotional content comprises selecting promotional content including an endorsement by the actress or actor.

7. A content analysis computing device comprising at least one processor in communication with at least one memory device, said content analysis computing device configured to:

receive enrollment data for a user in response to the user enrolling in a digital wallet application, the enrollment data including a device identifier identifying a user device associated with the user;

store the enrollment data within the at least one memory device;

receive, from a payment processing network, digital wallet transaction data as part of a digital wallet transaction for digital content from a digital content provider, the digital wallet transaction initiated by the user over the payment processing network using the digital wallet application on the user device, the digital content accessible or downloadable from a digital content provider computing device using the user device, the digital content provider computing device operated by the digital content provider;

determine, from the digital wallet transaction data received from the payment processing network, at least one content attribute associated with the digital content that is accessible or downloadable from the digital content provider computing device, wherein the at least one content attribute is a characteristic associated with the subject matter of the digital content, and wherein to determine the at least one content attribute, said content analysis computing device is configured to:

transmit a content attribute request message from said content analysis computing device to the digital content provider computing device, the content attribute request message including at least a portion of the digital wallet transaction data for the digital content; and receive at said content analysis computing device, in response to the content attribute request message, a content attribute response message from the digital content provider computing device, the content attribute response message including the at least one content attribute associated the digital content, the at least one content attribute determined by the digital content provider using the at least a portion of the digital wallet transaction data and a classification system maintained by the digital content provide;

store the at least one content attribute received from the digital content provider computing device within the at least one memory device, the at least one content attribute stored in association with the enrollment data to link the at least one content attribute to the user;

determine, based at least in part on the at least one content attribute, a content affinity for the user;

select promotional content that matches the content affinity; and cause the selected promotional content to be presented to the user on the user device by at least one of i) transmitting a push notification to the user device that includes the promotional content and ii) embedding the promotional content into multimedia content accessed by the user on the user device.

8. The content analysis computing device of claim 7, wherein said content analysis computing device is further configured to receive a geolocation signal from the user device that indicates a current geographic location of the user device, and wherein to select promotional content, said content analysis computing device is configured to select promotional content that matches the content affinity for the user and that matches the current geographic location of the user device.

9. The content analysis computing device of claim 7, wherein to determine a content affinity for the user, said content analysis computing device is configured to determine the content affinity based on the at least one content attribute and at least one additional content attribute associated with additional digital content purchased by the user.

10. A non-transitory computer readable medium that includes executable instructions for selecting promotional content based on digital wallet transaction data, wherein when executed by a content analysis computing device comprising at least one processor in communication with at least one memory device, the computer executable instructions cause the content analysis computing device to:
   receive enrollment data for a user in response to the user enrolling in a digital wallet application, the enrollment data including a device identifier identifying a user device associated with the user;
   store the enrollment data within the at least one memory device;
   receive, from a payment processing network, digital wallet transaction data as part of a digital wallet transaction for digital content from a digital content provider, the digital wallet transaction initiated by the user over the payment processing network using the digital wallet application on the user device, the digital content accessible or downloadable from a digital content provider computing device using the user device, the digital content provider computing device operated by the digital content provider;
   determine, from the digital wallet transaction data received from the payment processing network, at least one content attribute associated with the digital content that is accessible or downloadable from the digital content provider computing device, wherein the at least one content attribute is a characteristic associated with the subject matter of the digital content, and wherein to determine the at least one content attribute, the computer executable instructions cause the content analysis computing device to:
      transmit a content attribute request message from the content analysis computing device to the digital content provider computing device, the content attribute request message including at least a portion of the digital wallet transaction data for the digital content; and
      receive at the content analysis computing device, in response to the content attribute request message, a content attribute response message from the digital content provider computing device, the content attribute response message including the at least one content attribute associated the digital content, the at least one content attribute determined by the digital content provider using the at least a portion of the digital wallet transaction data and a classification system maintained by the digital content provider;
   store the at least one content attribute received from the digital content provider computing device within the at least one memory device, the at least one content attribute stored in association with the enrollment data to link the at least one content attribute to the user;
   determine, based at least in part on the at least one content attribute, a content affinity for the user;
   select promotional content that matches the content affinity; and
   cause the selected promotional content to be presented to the user on the user device by at least one of i) transmitting a push notification to the user device that includes the promotional content and ii) embedding the promotional content into multimedia content accessed by the user on the user device.

11. The non-transitory computer readable medium of claim 10, wherein the computer executable instructions further cause the content analysis computing device to receive a geolocation signal from the user device that indicates a current geographic location of the user device, and wherein to select promotional content, the computer executable instructions cause the content analysis computing device to select promotional content that matches the content affinity for the user and that matches the current geographic location of the user device.

12. The non-transitory computer readable medium of claim 10, wherein to determine a content affinity for the user, the computer executable instructions cause the content analysis computing device to determine the content affinity based on the at least one content attribute and at least one additional content attribute associated with additional digital content purchased by the user.

* * * * *